United States Patent [19]

Torimi et al.

[11] Patent Number: 4,821,141
[45] Date of Patent: Apr. 11, 1989

[54] GAS INSULATED SWITCHGEAR

[75] Inventors: Kiyokazu Torimi; Hiroshi Takeuchi; Keizo Takatsuka, all of Amagasaki, Japan

[73] Assignee: Mitsubishi Denki Kabushiki Kaisha, Japan

[21] Appl. No.: 100,632

[22] Filed: Sep. 24, 1987

[30] Foreign Application Priority Data

Sep. 29, 1986 [JP] Japan ................. 61-228348

[51] Int. Cl.$^4$ ............................................. H02B 1/04
[52] U.S. Cl. .................................. 361/341; 361/333; 361/335
[58] Field of Search ................. 200/148 F; 361/331, 361/333–335, 341, 346, 355, 361

[56] References Cited
FOREIGN PATENT DOCUMENTS
60-187217 9/1988 Japan .

Primary Examiner—A. D. Pellinen
Assistant Examiner—Gregory D. Thompson
Attorney, Agent, or Firm—Leydig, Voit & Mayer

[57] ABSTRACT

A gas insulated switchgear includes an interrupter connected to at least one bus bar through a disconnector and a monitor panel and having an operating mechanism disposed at eye level (with respect to ground). The operators of respective grounded switches, which are operable to disable the switchgear to allow inspections of the bus bar disconnector and the interrupter are arranged and positioned in the vicinity, and at the same face, of the operating mechanism of the interrupter, whereby the disconnector and the grounded switches can be operated and inspected at eye level.

3 Claims, 3 Drawing Sheets

GAS INSULATED SWITCHGEAR

BACKGROUND OF THE INVENTION

This invention relates to a gas insulating switchgear installed in an electrical station such as an electrical substation.

FIGS. 1 to 3 illustrate one example of a gas insulating switchgear which has been widely used heretofore and which is disclosed in Japanese Patent Laid-Open No. 60-187217.

This gas insulated switchgear is arranged to include an interrupter 1, bus side and line side disconnectors 2 and 3, grounded switches 4 and 5, and a transformer 8. These components are respectively contained within separate metallic vessels each filled with $SF_6$ gas, and connected to another through insulating spacers 10.

As shown in FIG. 2, the interrupter 1 is positioned horizontally behind an operator unit 11 and a monitor panel 12 disposed in a side-by-side relationship. Above the interrupter 1, the bus side and the line side disconnectors 2 and 3 are respectively connected to first and second openings provided on the side surfaces of the vessels with operators 13 and 14 being respectively and directly mounted thereon. Also, the grounded switches 4 and 5 are each connected to one of the openings of the respective vessels with operators 15 and 16 being respectively and directly mounted thereon. Control cables of the operators 15 and 16 are wired by protective pipes, such as wiring tubes 17, through various routes which are concentrated at the monitor panel 12, to allow further connection to the external circuit. A ground pipe 18 provides the connection to ground. Both the disconnectors 2 and 3 and the grounded switches 4 and 5 are electrically insulated from the metallic vessels and electrically operated to be opened and closed.

Reference numeral 6 designates bus bars, reference numeral 7 designates cable heads and reference numeral 9 designates line side support.

The operation and function of the above-described conventional switchgear will now be described.

The operational forces for the movable contacts of the disconnectors 2 and 3 as well as the grounded switches 4 and 5 are transmitted through sealed shafts mounted to the outer walls of the metallic vessels.

On the other hand, as shown in FIG. 1, the operational force of each operator mounted to the side wall of the metallic vessel, such as the operator 13 for the bus bar side disconnector, is transmitted to and output from the sealed shaft by a suitable power source including manual power.

The operators 13 to 16 of the disconnectors 2 and 3 as well as the grounded switches 4 and 5 are provided with handle insertion openings 20 for receiving therein respective manual handles and open-and-close state indication windows 19 so that operational state display and the direct manual operation can be achieved. Within the operator unit 11 disposed in front of the interrupter 1, an operator for the interrupter is contained so that the operation of the interrupter can be achieved not only remotely but also manually or electrically. The display of the operating states of the interrupter can be visually confirmed from a front inspection corridor through the state indication window 19.

A simulation bus bar monitoring window 22 is provided in the monitor panel 12 to monitor the state of the overall system and various indicators for alarm displays such as gas leakage. Also, a monitoring instrument window 21 is disposed in the monitor panel 12 to allow visual monitor of the gas pressure or the like.

Since the conventional system is constructed as described above and a number of vessels are combined in a complex manner, the structure is complex, the overall dimension of the switchgear is increased and it requires large installation space.

Moreover, the displays of the operating states of the interrupter 1 and the overall switchgear system can be visually confirmed from a position facing the frontal view of the switchgear (the front inspection corridor), the open-and-close indication of the disconnectors and the grounded switches is difficult to confirm due to the sideways dispositions of the operators 13–16 and the corresponding indication windows 19. Therefore, it is often necessary to climb over the vessels or to squeeze through narrow passages between the vessels to reach the desired operator during the manual operation, inspection and maintenance of the switchgear. Also, since the vessels, the operators with indication windows and the control cables are provided or arranged in arbitrary arrangement and route, the overall system becomes complex and heavy, degrading operability, maintenance and inspectability. Further, the time required for stopgap or permanent repair upon unforeseen accidents in the system can be disadvantageously prolonged.

SUMMARY OF THE INVENTION

This invention has the objectives of overcoming the above discussed problems and has, as its main object, the provision of a gas insulated switchgear in which the structural arrangement is simplified to minimize the installation space, eliminate the need for the inspection platform or the like, to improve safety and provide ease of inspection, maintenance, and operability, and to provide emergency repairs upon some unforeseen accident in a minimum of time.

In keeping with an aspect of the present invention, the gas insulated switchgear comprises a main unit including an interrupter contained within a vessel, a bus bar unit including bus bar side disconnectors contained within a common bus bar vessel and bus bars connected therebetween, and a monitor panel to which an interrupter operator for operating the interrupter and monitoring instruments are mounted, and wherein the bus bar vessel is connected to the front face of the vessel for the main unit.

The gas insulated switchgear of the present invention is arranged such that the operating mechanisms of respective grounded switchgears for inspection of the disconnector and the interrupter are positioned in the vicinity of and at the same side of the operating mechanism of the interrupter, whereby the disconnector and the grounded switch can be operated at ground level.

As has been described, since the operating mechanisms of respective grounded switchgears for inspection of the disconnector and the interrupter are positioned in the vicinity of and at the same side of the operating mechanism of the interrupter, inspection, maintenance and operation are easy and, without the need for the inspection platform or the like, the inspection, maintenance and operation can be achieved at the ground level in a manner similar to that of the operation mechanism of the interrupter.

BRIEF DESCRIPTION OF THE DRAWINGS

The present invention will now be described in conjunction with the preferred embodiment of the present invention taken in conjunction with the accompanying drawings, in which.

Throughout the figures, the same reference numerals designate identical or corresponding components.

PREFERRED EMBODIMENT OF THE PRESENT INVENTION

The invention will now be described in conjunction with the accompanying drawings in which one embodiment thereof is illustrated.

FIGS. 4 to 7 illustrate an embodiment of the present invention to be used in a feeder unit disposed between a bus bar and a feeder.

Figure 7:
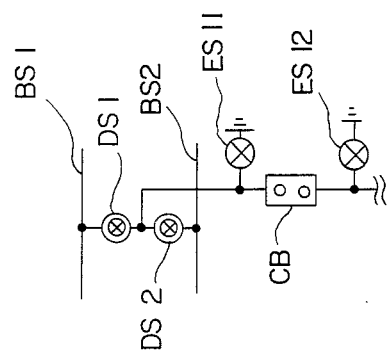
FIG. 7 is a circuit diagram of the gas insulated switchgear shown in FIG. 4.

In FIG. 7, BS1 and BS2 are first and second bus bars, respectively, DS1 and DS2 are first and second bus bar side disconnectors. The first bus bar BS1 and the first bus bar side disconnector DS1 are contained in a common vessel, to provide a first bus bar unit whereas a second bus bar unit is constructed in a similar fashion. The reference numeral CB designates a circuit interrupter, and ES11 and ES12 are grounded switches for disabling the circuit interrupter for inspection of the switchgear.

Figure 1:
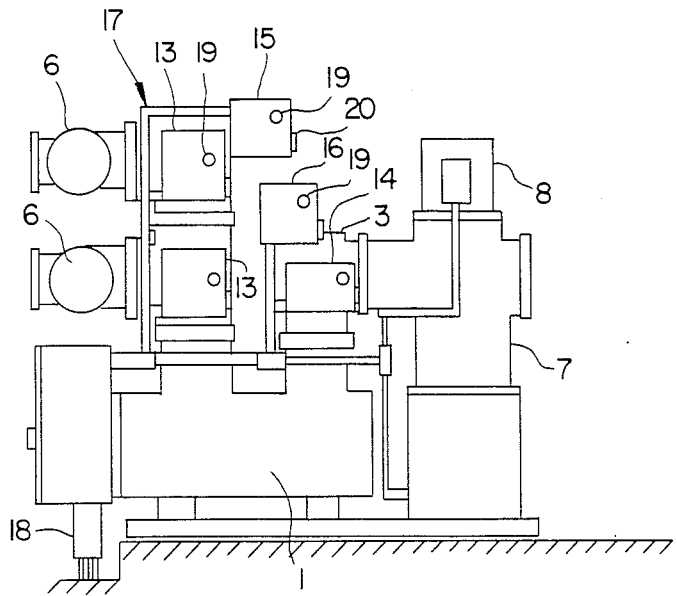
FIG. 1 is a side view of a conventional gas insulated switchgear.
Figure 2:
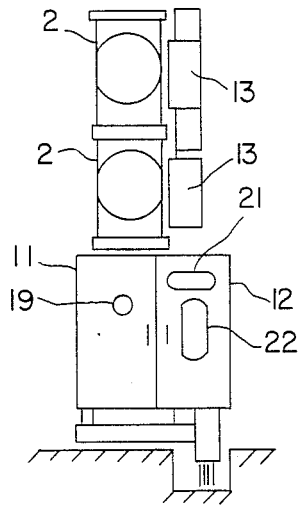
FIG. 2 is a front view of the conventional gas insulated switchgear shown in FIG. 1.
Figure 3:
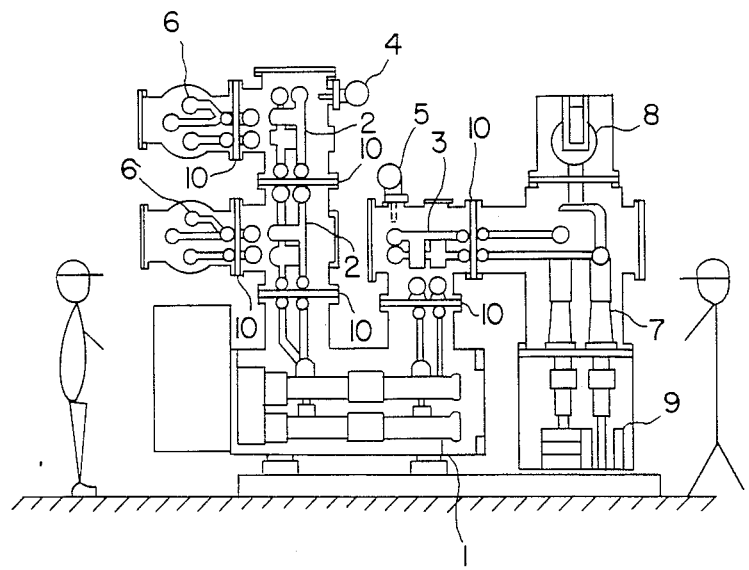
FIG. 3 is a schematic vertical sectional view with parts removed of the gas insulated switchgear shown in FIG. 1.
Figure 5:
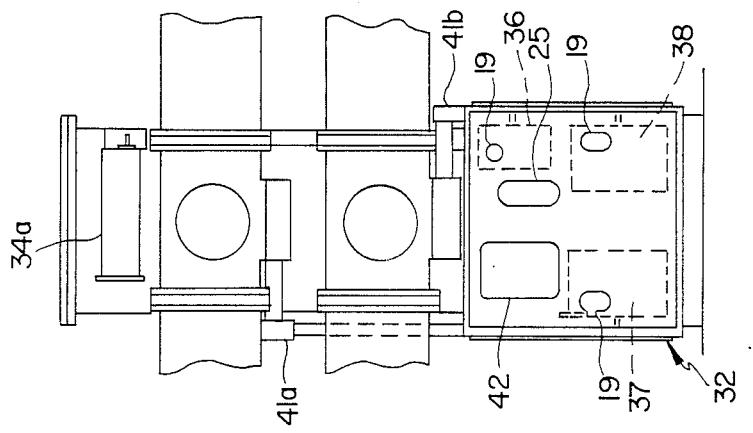
FIG. 5 is a front view of the gas insulated switchgear shown in FIG. 4.
Figure 4:
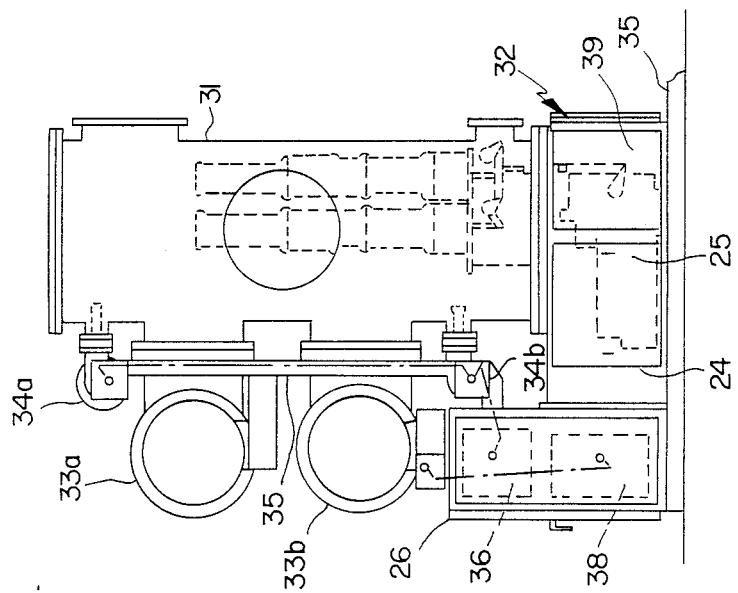
FIG. 4 is a side view of a gas insulated switchgear of one embodiment of the present invention.
Figure 6:
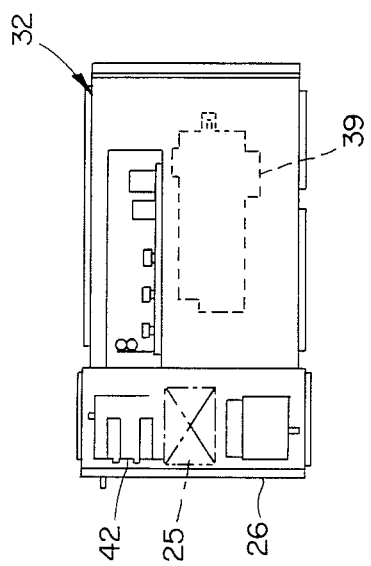
FIG. 6 is a top view of the gas insulated switchgear with parts removed illustrating the insides of an operator unit shown in FIG. 4.

In FIGS. 4 to 6, the reference numeral 31 designates a main unit having an interrupter disposed on an operator unit 32, and 33a and 33b designate first and second bus bar units disposed in front, and at substantially the same level, of the main unit 31. Designated by reference numerals 34a and 34b are grounded switches respectively connected to an operating mechanism of the interrupter to disable the operation of the interrupter. The grounded switch 34a for the stationary contact is disposed above the bus bar unit 33a while the grounded switch 34b for the movable contact is disposed below the bus bar unit 33b.

As shown in FIG. 4, the operator unit 32 is mounted on a unit base 35 and comprises an interrupter operator 39, a box-shaped interrupter operating unit 24 having, a control wiring block 25 at a front face thereof, and a box-shaped operator monitor unit 26 providing an operator 36 for the grounded switches and operators 37 and 38 for the disconnectors contained in the bus bar units 33a and 33b. As shown in FIG. 5, the operator 36 is positioned above the disconnector operators 37 and 38. The operator unit 32 also includes a monitor block 42.

Allowing a plurality of instruments and components to monitor the operating states of the interrupter and the insulated switchgear. As can be seen, indication windows 19 are provided to enable the maintenance crew to visually inspect or operate the system from an advantage point, i.e. the front inspection corridor.

Also, in about half of the space of the operator unit 32 which contains operator 39 for the interrupter, a control wiring block is housed 25 is mounted which provides electrical connections between control components for the entire gas insulated switchgear, to the external circuit and additional control components such as a remote control system and an alarm transmitter system may further be incorporated.

The disconnectors for the bus bar units 33a and 33b are connected to the operators 37 and 38, which are housed in the operator unit 32, by means of bus bar side unit connecting mechanisms 41a and 41b, so that electrical corrections and operations may be directed from the front inspection corridor or by remote control. Also, the use of the open-closed indication windows 19 eliminates the need for opening the door of the operator unit 32 from the front inspection corridor when inspecting the conditions of the interrupter mechanism or operating states of the switches.

Furthermore, since the gas insulated switchgear of the present invention is arranged in such a way that, the operation and the monitoring of the switch devices can be achieved from the front inspection corridor at about human eye level, daily maintenance and inspection can be easily made, and operability and safety are improved providing a significant economic advantage. In the event of an accident, no effusive work on the operators, the wiring and ducts necessary to reduce repair cost and time is required.

Also, since the various equipments are functionally arranged, replacement or inspection of components can be easily achieved without the need for any additional operation such as disassembly of other equipment.

Since the conventional gas insulated switchgear is provided at its side face with operators adjacently or directly mounted thereto and the wiring ducts and cables being mounted to horizontally and vertically extend on the side face, the position at which the operators are mounted are high, and inspection platforms or the like are provided between the adjacent units, so that the structure is complicated and difficult to be inspected. However, according to the present invention, these problems can be easily solved, and the installation space is minimized, and economy and reliability are advantageously improved.

While the description has been made in terms of the components from the bus bars of the feeder units, to the grounded switches, similar effects as previously discussed can be obtained by putting the arrangement on the line side of the system. Namely, the line disconnectors, the grounded switches, the cable heads and the transformers, are all included in a line side unit to be connected to the main unit previously described.

As has been described, according to the present invention, the operating mechanism of the insulated switchgear which take the form of the operator for the grounded switches is provided in the vicinity of and on the same side face of the interrupter, so that the operation and monitoring can be achieved at eye level (with respect to ground), providing easy maintenance and inspection, improving the operability and safety, and therefore making it easy to cope with an accident within a short time. As a result the structure is simplified and installation space can be reduced.

What is claimed is:

1. A gas insulated switchgear comprising:
a main unit housing an interrupter;
a plurality of bus bar units electrically connected to said interrupter of said main unit at a front face thereof, said bus bar units having disconnectors;
a pair of grounded switches respectively electrically connected to said interrupter and operable to disable said interrupter for inspection thereof; and
an operator unit having an interrupter operator connected to said interrupter, said operator unit being mounted on a base below said interrupter main unit, said operator unit having a monitor unit on a front face thereof, said bus bar units being located above said monitor unit, said monitor unit providing operators for said grounded switches and said disconnectors, said operators being positioned in the vicinity and at a same side of said interrupter main unit to allow operating maintenance and operating inspection of said operators and interrupter operator to be easily performed from the same side of said interrupter main unit.

2. A gas insulated switchgear as claimed in claim 1 further comprising a housing containing said operators of said monitor unit and windows allowing operator inspection.

3. A gas insulated switchgear as claimed in claim 2 further including a control wiring block placed in tandem with said interrupter operator of said interrupter, said block providing electrical connections to said operators and switches, said control wiring block being disposed at a front face of said operator unit and adjacent to said monitor unit in a side-by-side relationship.

* * * * *